3,025,262
FLAMEPROOFING OLEFIN POLYMERS
Heinrich Peters, Wiesbaden, Dietrich Schleede, Frankfurt am Main, and Hellmut Jochinke and Helmut Klug, Gersthofen, near Augsburg, Germany, assignors to Farbwerke Hoechst Aktiengesellschaft vormals Meister Lucius & Brüning, Frankfurt am Main, Germany, a corporation of Germany
No Drawing. Filed Dec. 14, 1959, Ser. No. 859,106
Claims priority, application Germany Dec. 20, 1958
6 Claims. (Cl. 260—45.75)

The present invention relates to a process of flameproofing olefin polymers.

Olefin polymers can be obtained by diverse processes and can thereby, depending on the required purpose, be largely varied in their physical properties. However, said olefin polymers always have the disadvantage of burning easily, as do low molecular paraffins. This is of no importance for most fields of application. For certain purposes, however, for example in the field of electrical engineering, it is desirable to apply an incombustible synthetic plastic having the mechanical properties of a polyolefin.

Many attempts have been made, therefore, to render olefin polymers flameproof, for example by the addition of chloro-paraffins. It has, however, practically not been possible up to the present time to find suitable additions therefor, either because these substances are not sufficiently effective or incompatible with olefin polymers thereby deteriorating the color or the mechanical properties of the latter to a substantial degree. Due to the homopolar character of the olefin polymers and due to the polarity of most flameproofing agents, there were but few chances of solving this problem.

Now we have found that olefin polymers can be rendered flame-resistant by mixing them homogeneously with octachloro-diphenylene-dioxide and an oxygen compound and/or a sulphur compound of an element of group V of the periodic table having an atomic weight of at least 74, such as arsenic, antimony and bismuth. We have found, and this being unexpected, that the substances added according to the invention impart self-extinguishing properties to the olefin polymers. Furthermore, also the flexural stress at a given deflection, the ball indentation hardness and the modulus in torsion are improved while the color and the mechanical properties of the polymer are not impaired.

The following olefin polymers can be rendered flame-resistant according to the process of the invention: Polymers of polymerizable monomers of the general formula $CH_2=CHR$, wherein R represents a hydrogen atom, a $CH_3$ group or a linear or branched, saturated or unsaturated aliphatic hydrocarbon radical containing 2 to 10 carbon atoms; especially ethylene, propylene, butylene, isobutylene, pentene, methylpentene, butadiene, dimethyl butadiene; cyclic polymerizable compounds, such as styrene, dimethyl styrene; copolymers of the said compounds with one another or with other compounds which are copolymerizable therewith, such as unsaturated organic acids or the esters or nitriles thereof, for example maleic acid, citraconic acid, itaconic acid, acrylic acid, methacrylic acid ester, acrylonitrile, or with vinyl compounds or vinylidene compounds, especially vinyl chloride, vinylidene chloride, vinyl acetate, and also polymer compositions of all polymers mentioned above. A particularly advantageous effect is obtained according to the invention in polyethylene and copolymers of ethylene with its higher homologs.

Octachloro-diphenylene-dioxide can be obtained by the known processes, for example by the prolonged heating of penta-chlorophenol at about 300° C.

As oxygen compounds and sulphur compounds which are used according to the invention in admixture with octachloro-diphenylene-dioxides, there enter into consideration above all: antimony trioxide, antimony pentoxide, antimony trisulfide, antimony pentasulfide, arsenic trioxide, arsenic pentoxide, arsenic trisulfide, also bismuth trioxide. It may be of advantage to apply a composition of several of the aforesaid compounds.

Octachloro-diphenylene-dioxide is generally added to the polyolefin in amounts ranging from 5 to 80 percent by weight, preferably from 8 to 40 percent by weight, calculated on the total amount of the polyolefin applied. The aforecited oxides and sulfides of the elements mentioned above are admixed to the polymer according to the invention in an amount ranging from 3 to 50%, preferably 5 to 20% (calculated on the total olefin polymer).

Octachloro-diphenylene-dioxide and the oxides and/or sulfides of the aforementioned elements can be admixed to the olefin polymer separately; however, it is recommended that these two components are pre-mixed and then only admixed to the respective polymer.

Olefin polymers that have been rendered flame-resistant with octachloro-diphenylene-dioxide can be used in all fields in which these properties are required and olefin polymers, for this reason, could not be applied hitherto, for example in certain fields of electrical engineering.

The following examples serve to illustrate the invention, but they are not intended to limit it thereto:

Example 1

760 grams of a pulverulent low-pressure polyethylene (density 0.95 g./cm.$^3$), 190 grams of octachloro-diphenylene-dioxide and 50 grams of antimony trioxide are mixed for one minute in a high-speed mixer (Starmix) usual in industry, milled on a two-roll mix at 160° C. for 10 minutes, then the rough sheet is cut into small pieces which are molded under contact pressure into a 3 mm. thick plate on a heatable hydraulic molding press at 160° C. Upon cooling, the pressure is raised to 100 kg./cm.$^2$. When mixing and working up the octachloro-diphenylene-dioxide and the antimony trioxide with low-pressure polyethylene, the mixture preserves a light color. The ball indentation hardness, the flexural stress at a given deflection and the modulus in torsion of the plates thus fabricated are higher than those of a similar plate consisting only of the polyethylene applied. The notched bar impact strength hardly decreases.

When a 3 cm. broad strip of the plate is held for 10 seconds into the non-luminous flame of a Teclu burner in a manner such that the lower edge of the strip is 1 cm. above the apex of the inner cone of the flame and then withdrawn slowly, it extinguishes within 3 seconds. This test can be repeated with the same strip several times in succession while obtaining the same result.

Example 2

75 grams of a pulverulent copolymer of which about 90 mole percent consists of ethylene and 10 mole percent of propylene (density=0.925 g./cm.$^3$); 20 grams of octachloro-diphenylene-dioxide and 5 grams of antimony trioxide are mixed for one minute in a high-speed mixer (Starmix) usual in industry, milled on a two-roll mill at 145° C. for 10 minutes, then the rough sheet is cut into small pieces which are molded under contact pressure into a 3 mm. thick plate on a heatable hydraulic molding press at 160° C. Upon cooling, the pressure is increased to 100 kg./cm.$^2$. When mixing and working up the octachloro-diphenylene-dioxide and the antimony trioxide with the copolymer, the mixture preserves its light color.

When a 3 cm. broad strip of the plate is held for 10 seconds into the non-luminous flame of a Teclu burner in a manner such that the lower edge of the strip is 1 cm. above the apex of the cone of the flame and then slowly withdrawn, it extinguishes within 10 seconds.

*Example 3*

The operation is carried out as described in Example 2. Instead of the ethylene propylene copolymer there is used a copolymer of which about 99.2 mole percent consists of ethylene and 0.8 mole percent of butene (density=0.945 g./cm.$^3$), and instead of antimony trioxide there is added arsenic trioxide. When carrying out the flame test, the test strip extinguishes within 10 seconds.

*Example 4*

750 grams of a granular product of a high-pressure polyethylene having an $i_2$ value of 1.5 (according to ASTM 1238–52T) and a density of 0.918 g./cm.$^3$, is milled on a two-roll mill with 150 grams of octachloro-diphenylene-dioxide and 100 grams of $Sb_2O_3$ at 130° C. for 10 minutes. The rough sheet is cut into small pieces which are molded under contact pressure into a 3 mm. thick plate on a heatable hydraulic molding press at 140° C. Upon cooling, the pressure is raised to 100 kg./cm.$^2$. The mixture has a light color.

When a 3 cm. broad strip of the plate is held for 10 seconds into the non-luminous flame of a Teclu burner in a manner such that the lower edge of the strip is 1 cm. above the apex of the inner cone of the flame and then withdrawn slowly, it extinguishes within 5 to 10 seconds.

*Example 5*

A mixture consisting of 500 grams of a low-pressure polyethylene of a density of 0.95 g./cm.$^3$ and 100 g. of high-pressure polyethylene of a density of 0.918 g./cm.$^3$ is milled on a two-roll mill with 300 grams of octachloro-diphenylene-dioxide and 100 grams of $Sb_2O_3$ at 155° C. for 10 minutes. One of the pressure-molded plates made from this mixture, being 1 mm. thick, 2 cm. broad and 3 cm. long, is clamped in a horizontally extended forked clamp. In a room protected against draught, a gas flame is directed in an inclined position from the bottom towards the free front edge of the specimen so that the latter starts burning. When the flame is withdrawn, the plate extinguishes after two seconds.

*Example 6*

Pressure-molded plates made from a mixture of 500 grams of low-pressure polyethylene (density 0.95 g./cm.$^3$), 100 grams of a copolymer 90 mole percent of which consists of ethylene and 10 mole percent of propylene (density 0.925 g./cm.$^3$), 350 grams of octachloro-diphenylene-dioxide and 50 grams of $Bi_2O_3$ are tested as to their flame-resistance, as described in Example 5. When the flame is withdrawn, the specimens extinguish after ten seconds.

*Example 7*

Test plates being 1 mm. thick, 2 cm. broad and 3 cm. long are pressure-molded from 750 grams of a copolymer of which 60 mole percent consist of ethylene and 40 mole percent of propylene (density 0.850 g./cm.$^3$) and which had been milled for 10 minutes on a two-roll mill with 200 grams of octachloro-diphenylene-dioxide and 50 grams of $Sb_2S_3$ at 160° C. When carrying out the flame test as described in Example 5, the specimens extinguished 7 seconds after the flame had been withdrawn.

We claim:

1. An olefin polymer selected from the group consisting of polyethylene, polypropylene, ethylene-propylene copolymers, and ethylene-butene copolymers, which polymers have been rendered flame-resistant by an addition of (1) octachloro-diphenylene-dioxide and (2) at least one compound selected from the group consisting of antimony trioxide, antimony trisulfide, arsenic trioxide, and bismuth trioxide, said addition being homogeneously admixed with the said olefin polymers.

2. A polyethylene which has been rendered flame-resistant by an addition of (1) octachloro-diphenylene-dioxide and (2) at least one compound selected from the group consisting of antimony trioxide, antimony trisulfide, arsenic trioxide, and bismuth trioxide, said addition being homogeneously admixed with the said polyethylene.

3. A low pressure polyethylene which has been rendered flame-resistant by an addition of (1) octachloro-diphenylene-dioxide and (2) at least one compound selected from the group consisting of antimony trioxide, antimony trisulfide, arsenic trioxide, and bismuth trioxide, said addition being homogeneously admixed with the said low pressure polyethylene.

4. An ethylene-propylene copolymer which has been rendered flame-resistant by an addition of (1) octachloro-diphenylene-dioxide and (2) at least one compound selected from the group consisting of antimony trioxide, antimony trisulfide, arsenic trioxide, and bismuth trioxide, said addition being homogeneously admixed with the said ethylene-propylene copolymer.

5. An olefin polymer selected from the group consisting of polyethylene, polypropylene, ethylene-propylene copolymers, and ethylene-butene copolymers, which polymers have been rendered flame-resistant by an addition of (1) 5–80% octachloro-diphenylene-dioxide and (2) 3–50% of at least one compound selected from the group consisting of antimony trioxide, antimony trisulfide, arsenic trioxide, and bismuth trioxide, said addition being homogeneously admixed with the said olefin polymers.

6. An olefin polymer selected from the group consisting of polyethylene, polypropylene, ethylene-propylene copolymers, and ethylene-butene copolymers, which polymers have been rendered flame-resistant by an addition of (1) 8–40% octachloro-diphenylene-dioxide and (2) 5–20% of at least one compound selected from the group consisting of antimony trioxide, antimony trisulfide, arsenic trioxide, and bismuth trioxide, said addition being homogeneously admixed with the said olefin polymers.

References Cited in the file of this patent

UNITED STATES PATENTS

| | | |
|---|---|---|
| 2,918,451 | Elliott | Dec. 22, 1959 |
| 2,925,398 | Coran et al. | Feb. 16, 1960 |